United States Patent
Shu et al.

Patent Number: 6,031,626
Date of Patent: Feb. 29, 2000

[54] COLOR STOCHASTIC SCREENING WITH OPTIMAL COLOR DOT PLACEMENT

[75] Inventors: Joseph Shu, San Jose; Hakan Ancin; Anoop Bhattacharjya, both of Sunnyvale; Chia-Hsin Li, San Jose, all of Calif.

[73] Assignee: Seiko Epson Corporation, Tokyo, Japan

[21] Appl. No.: 08/889,204

[22] Filed: Jul. 7, 1997

Related U.S. Application Data

[60] Provisional application No. 60/028,615, Aug. 15, 1996, and provisional application No. 60/034,263, Dec. 20, 1996.

[51] Int. Cl.$^7$ .................................................... H04N 1/52
[52] U.S. Cl. .......................... 358/1.9; 358/533; 358/536
[58] Field of Search .......................... 358/1.9, 533, 534, 358/535, 536, 501, 454, 456, 457, 466, 298; 382/237, 270, 271; 345/150, 153, 155

[56] References Cited

U.S. PATENT DOCUMENTS

| | | |
|---|---|---|
| 4,037,533 | 7/1977 | Rapoport et al. . |
| 4,462,024 | 7/1984 | Strolle . |
| 4,485,397 | 11/1984 | Scheuter et al. . |
| 4,595,948 | 6/1986 | Itoh et al. ................................. 358/535 |
| 4,876,611 | 10/1989 | Fischer et al. . |
| 4,924,522 | 5/1990 | Bray et al. . |
| 5,138,303 | 8/1992 | Rupel . |
| 5,287,195 | 2/1994 | Blumer . |
| 5,341,153 | 8/1994 | Benzschawel et al. . |
| 5,394,252 | 2/1995 | Holladay et al. . |
| 5,426,723 | 6/1995 | Horsley . |
| 5,429,047 | 7/1995 | Marmolejo et al. . |
| 5,488,451 | 1/1996 | Goggins . |
| 5,526,255 | 6/1996 | Shenk . |
| 5,548,305 | 8/1996 | Rupel . |
| 5,548,407 | 8/1996 | von Kienlin et al. . |
| 5,555,475 | 9/1996 | Perowne et al. . |

*Primary Examiner*—Scott Rogers
*Attorney, Agent, or Firm*—Mark P. Watson

[57] ABSTRACT

An improved display of a color image is achieved by an optimum placement of color dots using an efficient stochastic screening process in which display elements are formed according to a priority ranking of color and according to a spatial-priority matrix. Various combinations of basic colors are ranked in priority according to visibility such that elements in a stochastic screen are first formed for the most visible colors. The number of elements in the screen that are used to represent more than one basic color is minimized. In preferred embodiments, a spatial-priority matrix is used to control the placement of colors in a stochastic screen such that an optimally uniform distribution of colors is achieved. A process for generating a spatial priority matrix for display devices that do not have a one-to-one display aspect ratio is described.

21 Claims, 2 Drawing Sheets

COLOR STOCHASTIC SCREENING WITH OPTIMAL COLOR DOT PLACEMENT

CROSS-REFERENCE TO RELATED APPLICATIONS

This application claims the benefit of priority of provisional application Ser. No. 60/028,615 filed Aug. 15, 1996 and provisional application Ser. No. 60/034,263 filed Dec. 20, 1996.

TECHNICAL FIELD

The present invention relates generally to the display of color images and more particularly to an efficient technique for color stochastic screening to display color images that depict uniform areas of color more accurately.

BACKGROUND ART

Various display devices like computer printers and computer monitors present images with a broad range of colors by forming small spots or picture elements (pixels) using only a limited number of primary colors. The spatial densities and/or size of the pixels for each primary color are adapted to represent a range of colors. For example, many printing devices use cyan, magenta, yellow and possibly black inks to display color images. Many video display devices and computer monitors such as cathode ray tube (CRT) and liquid crystal display (LCD) devices use elements emitting red, green and blue light to display color images.

In one type of presentation, variations in color are obtained using pixels of uniform size by varying the spatial density or separation between pixels for each primary color. In another type of presentation, variations in color are obtained by varying the spatial density of pixels as well as the size of each pixel for each primary color. Although more particular mention is made herein of presentations that vary only pixel density, the present invention may be used with either type of presentation.

Both accuracy and uniformity of perceived color are affected by how the pixels of each primary color are placed. For example, with techniques known as periodic screening, it is well known that slight errors in alignment between regularly-spaced grids of pixels for each primary color will combine to generate moire or interference patterns which produce color variations in areas that are supposed to be of uniform color. Another problem manifests itself as shifts in color as the grids or screens of pixels are displaced relative to one another. These displacements in pixel positions, or registration errors, alter the perceived color. A number of techniques have been developed to minimize these effects.

One technique reduces the visibility of moire patterns by rotating the grid for pixels of one primary color relative to the grid for pixels of another primary color. Generally, as the angle between grids increases, the frequency of the resulting moire increases to a point where the interference pattern is not too visible. Unfortunately, this technique does not work as well for images formed from several primary colors because it is very difficult to choose suitable angles between all of the grids of the several primary colors. Furthermore, it is essentially impossible to apply this technique with devices like computer printers and monitors that are constrained to present pixels at fixed, regularly-spaced positions defined by grids that cannot be rotated relative to one another.

Because of these limitations, other techniques known as stochastic screening have been used with varying degrees of success, These techniques generate pseudo-random distributions of pixels to reduce or eliminate the periodic artifacts resulting from periodic placement of pixels within regularly-spaced grids. In U.S. Pat. No. 5,485,397, for example, a disclosed technique analyzes an image to determine areas of nearly constant color density, divides these areas into smaller segments of nearly constant area, calculates the number of pixels needed for each primary color to achieve the desired pixel density in each segment, and distributes the calculated number of pixels in a pseudo-random manner within each segment. In U.S. Pat. No. 4,876,611, a disclosed technique recursively divides an image into progressively smaller areas and locates pixels of the primary colors in each of these smaller areas in such a way that the correct average pixel density for all primary colors is maintained for larger areas. Unfortunately, these and other stochastic techniques require considerable processing resources to determine how pixels for each primary color should be located and each suffers from visible alterations in color caused by registration errors.

In U.S. Pat. No. 5,394,252, many problems with both periodic screening and stochastic screening are overcome by using both regularly-spaced grids and irregularly-spaced or randomly-spaced grids. Unfortunately, the requirement to use at least one irregularly-spaced grid is incompatible with devices like computer printers and monitors that present pixels at regularly-spaced intervals.

DISCLOSURE OF INVENTION

It is an object of the present invention to provide for the display of color images that are free of variations in color in areas that are supposed to be of uniform color, that can be implemented efficiently, and that can be used with computer display devices like printers and monitors.

In accordance with the teachings of one aspect of the present invention, a method for generating output signals for use in a device for displaying a color image comprises receiving a signal representing the density of two or more basic colors in an area of the image, calculating pixel counts for selected basic colors and combinations of basic colors, forming elements in a stochastic screen in a spatial order defined by a spatial-priority matrix to represent the selected basic colors and combinations of basic colors in order according to a priority ranking of the selected colors and in numbers according to the calculated pixel counts, and generating an output signal in response to the stochastic screen.

Throughout this disclosure, reference is made to "basic colors." It is anticipated that the basic colors generally will be the appropriate primary colors for a particular display device. In a printer, for example, the basic colors could be cyan, magenta, yellow and possibly black. In a computer monitor using a CRT, the basic colors could be red, green and blue. As these examples show, the present invention is not restricted to any particular set of basic colors. Other colors instead of or in addition to the primary colors may be used to practice the present invention.

Reference is also made to the term "spatial-priority matrix." A dither matrix may be used to implement this feature; however, the manner of implementation is not critical to the practice of the present invention. The important feature is the provision of a priority ranking of spatial distribution in a stochastic screen. For this reason, the term "spatial-priority matrix" is used herein to express this feature without any limitations implied by any particular implementation.

In accordance with the teachings of another aspect of the present invention, a method for generating a spatial-priority matrix for a display device having an arbitrary aspect ratio comprises receiving a spatial-priority signal representing orders of fill in a square stochastic screen, receiving an aspect-ratio signal representing the dimensions of output presented by the display device, forming groups of elements in the spatial-priority matrix according to the aspect-ratio signal so as to have dimensions inversely proportional to the dimensions of output, and assigning values to elements in each group of elements according to a corresponding element in the square matrix.

The various features of the present invention and its preferred embodiments may be better understood by referring to the following discussion and the accompanying drawings. The contents of the following discussion and the drawings are set forth as examples only and should not be understood to represent limitations upon the scope of the present invention.

MODES FOR CARRYING OUT THE INVENTION

Figure 1:
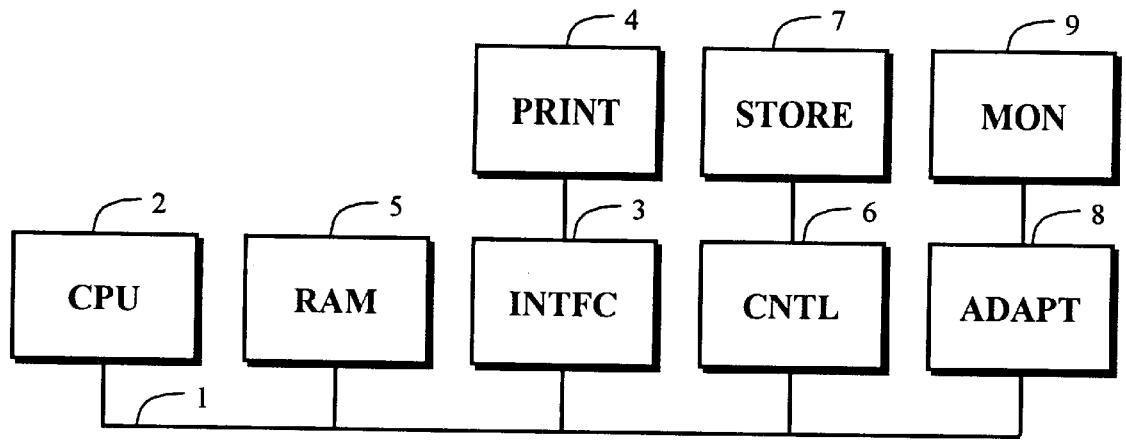
FIG. 1 is a functional block diagram illustrating a typical computer system in which the present invention may be practiced.

FIG. 1 illustrates an exemplary computer system in which various aspects of the present invention may be practiced. CPU 2 provides computing resources. Interface 3 provides an interface to printer 4. Controller 6 represents an interface to storage device 7, such as a magnetic tape drive or a disk drive. Adaptor 8 provides an interface to display monitor 9. RAM 5 is system random access memory (RAM). In the example shown, all major system components connect to bus 1; however, a bus architecture is not critical to practice the present invention. Some components such as a keyboard that are common to many computer systems are not shown.

The present invention pertains to the presentation of images on various display devices such as printer 4 and monitor 9. Operations required to practice the present invention are typically represented in program instructions that are stored in storage device 7, copied into RAM 5 and executed by CPU 2. One aspect of the present invention can be conveniently implemented in a type of program known as a device driver.

Various aspects can also be implemented in display devices using processing circuitry such as application specific integrated circuits, general-purpose integrated circuits, microprocessors controlled by programs embodied in various forms of read-only memory (ROM) or RAM, and other techniques. Printing display devices comprise a display component for printing on a medium such as an ink jet, dot matrix or laser printing mechanism. Display devices like a computer monitor comprise a display component for presenting a visual image such as a CRT or an LCD panel. No particular display component is critical to the practice of the present invention.

Figure 2:
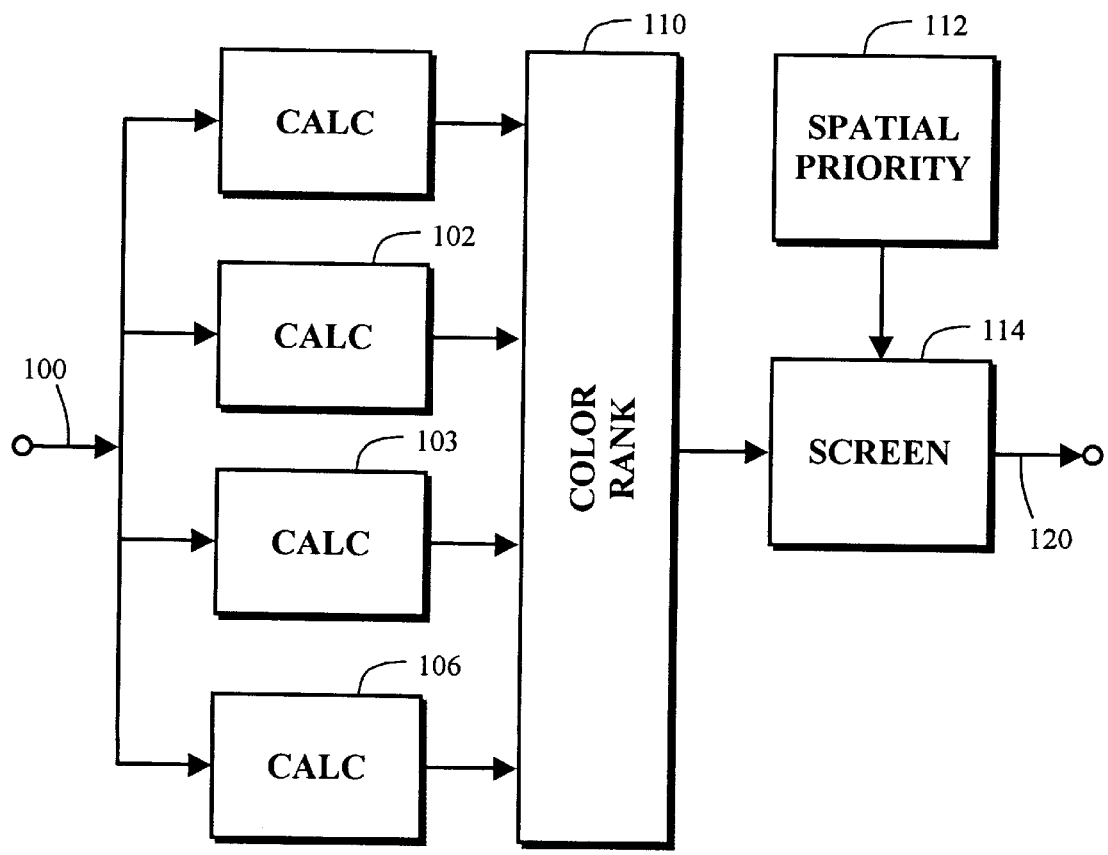
FIG. 2 is a functional block diagram illustrating the formation of a stochastic screen according to one aspect of the present invention.

FIG. 2 illustrates the formation of a stochastic screen according to one aspect of the present invention. A signal is received from path 100 that represents the density of two or more basic colors in an area of a color image to be displayed. For a color display device such as a printer, for example, the basic colors could be cyan, magenta, yellow and possibly black. In response to this signal, calc 101 calculates the pixel count for one basic color, say cyan, that is required to achieve the proper density for that color. Calc 102 calculates the pixel count for another basic color, say magenta, that is required to achieve the proper density for that color as indicated by the signal received from path 100. Calc 103 calculates the pixel count for a combination of colors, say cyan-plus-magenta. Calc 106 calculates the appropriate pixel count for yet another basic color, say yellow. Although not shown in the figure, pixel counts for other basic colors and/or combinations of basic colors could also be calculated. For example, pixel counts could be calculated for the colors black and cyan-plus-magenta-plus-yellow.

For ease of discussion, the basic colors and combinations of basic colors for a typical printing system will sometimes be referred to herein as follows: C=cyan, M=magenta, Y=Yellow, K=black, C+M=cyan-plus-magenta, C+Y=cyan-plus-yellow, M+Y=magenta-plus-yellow, and K'=C+M+Y=cyan-plus-magenta-plus-yellow.

Screen 114 forms a stochastic screen in which screen elements represent various basic colors and combinations of basic colors. The order in which the colors are formed is specified by a ranking of colors and the spatial distribution within the screen is specified by a spatial priority. Information representing the formed stochastic screen is passed along path 120 and subsequently used to prepare signals which will generate the desired image in a display device.

Color rank 110 defines the ranking or priority for selected colors. According to the example discussed above, the selected colors are cyan, magenta and cyan-plus-magenta. Preferably, the order of the ranking is according to visibility with the color having the greatest visibility ranked first. In this example, cyan-plus-magenta is ranked first, cyan is ranked second, and magenta is ranked third. The priority provided by color rank 110 determines the order in which colors are formed in the stochastic screen. For example, if the stochastic screen is a 16-by-16 array of 256 elements and the signal received from path 100 indicates that the density for cyan is 75% and the density for magenta is 50%, then appropriate pixel counts for cyan and magenta in the stochastic screen are 192 and 128, respectively. It can be readily seen that at least 64 pixels in the screen must represent both cyan and magenta; however, according to the present invention, no more than 64 pixels will be used to represent cyan and magenta. This may be accomplished by first forming 64 pixels to represent cyan-plus-magenta, then forming 128 other pixels to represent cyan, then using the remaining 64 pixels to represent magenta. As explained above, the order in which colors are placed into the screen is specified by the color ranking provided by color rank 110.

Spatial priority 112 provides information specifying the spatial distribution of colors within the stochastic screen. This information defines the spatial order of fill for the stochastic screen and could be provided by a dither matrix used in conventional periodic screening. In preferred embodiments, this information is provided from a particular spatial-priority matrix described in more detail below.

In one embodiment, spatial priority 112 is implemented by a spatial-priority matrix of I-by-J elements having unique values that range from one to I·J. If a pixel count indicates that only one pixel of a particular color is needed, the element in the spatial-priority matrix having the value of one defines the location for that one pixel in the corresponding stochastic screen. If the pixel count indicates that ten pixels are needed, the elements in the matrix having values from one to ten define the locations in the corresponding stochastic screen.

yellow. According to the present invention, if any elements in the stochastic screen do not yet represent any color, those elements are used first to represent yellow. Preferably, the order in which these unused or "white" elements are used is specified by spatial priority 112. If the number of yellow pixels exceeds the number of unused or white elements, the remaining number of yellow pixels that are required are formed in elements already representing one or more other colors. The order is defined by spatial priority 112. In the current example, if calc 106 indicates that 100 yellow pixels are required, the elements having numbers from 1 to 100 define the appropriate locations in the stochastic screen. The first 64 pixels would then represent cyan-plus-magenta-plus-yellow. The next 36 pixels would represent cyan-plus-yellow.

The example discussed above can be represented more generally by the following fragment of pseudo-code where $P_C$, for example, represents the number of cyan pixels calculated in response to the signal received from path 100, SPM represents an I-by-J spatial-priority matrix implementing spatial priority 112, and SS represents an I-by-J stochastic screen. The ranking of colors as defined by color rank 110 is implemented by the order of the program statements that form elements in the stochastic screen. According to one aspect of the present invention, the formation of elements in a stochastic screen could proceed as follows:

```
P_{C+M} = P_C + P_M - (I · J)              // no. of cyan + magenta
if P_{C+M} < 0 then                         // if less than zero then . . .
    N_W = -P_{C+M}                          // some pixels will be unused for C, M
    P_{C+M} = 0                             // set to zero
else N_W = 0                                // all pixels will be used for C, M
P_C = P_C - P_{C+M}                         // no. of cyan only
P_M = P_M - P_{C+M}                         // no. of magenta only
for i = 1 to I                              // loop through spatial priority matrix
    for j = 1 to J
        if P_{C+M} ≥ SPM[i,j] then
            SS[i,j] = C+M                   // first place C + M as needed
        elseif (P_{C+M} + P_C) ≥ SPM[i,j] then
            SS[i,j] = C                     // then place C as needed
        elseif (P_{C+M} + P_C + P_M) ≥ SPM[i,j] then
            SS[i,j] = M                     // then place M as needed
        elseif (P_{C+M} + P_C + P_M + P_Y) ≥ SPM[i,j] then
            SS[i,j] = Y                     // then place Y as needed
    next j
next i
P_Y = P_Y - N_W                             // no. of yellow remaining
for i = 1 to I                              // loop through spatial priority matrix
    for j = 1 to J
        if P_Y ≥ SPM[i,j] then
            SS[i,j] = SS[i,j] + Y           // add Y as needed
    next j
next i
```

In the example discussed above, the elements having values from 1 to 64 define the locations for the cyan-plus-magenta pixels. The elements having values from 65 to 192 define the locations for the 128 cyan pixels. The elements having values from 193 to 256 define the locations for the 64 magenta pixels.

Continuing the example, if calc 106 indicates that some number of yellow pixels are needed, an appropriate number of elements in the stochastic screen are formed to represent It should be appreciated that the code fragment above is not intended to show an optimized, practical program but is shown only to assist in understanding one aspect of the present invention.

The first line of the code fragment determines the value $P_{C+M}$, which represent the number of stochastic screen elements that must represent both cyan and magenta pixels. This number is equal to the total of the number of required cyan and magenta pixels less the total number of elements in the stochastic screen. The second through fourth lines calculate $N_w$, the number of pixels that will not represent either cyan or magenta, and also ensure that $P_{C+M}$ is never less than zero. The fifth and sixth lines of the code fragment adjust the initially calculated numbers of cyan and magenta pixels, $P_c$ and $P_M$, respectively, to account for the fact that some of the cyan and magenta pixels may be represented together in common screen elements.

The seventh and eight lines of the code fragment are the beginning of two nested "for" loops that visit each element [i,j] of the spatial-priority matrix SPM and the stochastic screen SS. Within those two loops, the required number of screen elements for the color deemed to be most visible, e.g., cyan-plus-magenta, are formed first. After all cyan-plus-magenta screen elements have been formed, subsequent passes through the loops form the required number elements for the next most visible colors, e.g., cyan-only elements, then magenta-only elements. Finally, yellow-only elements are formed. If no unused or white screen elements remain after all cyan and magenta pixels are accounted for, no yellow pixels will be placed in the first set of loops.

In the line of code immediately following the first two nested loops, the number of required yellow pixels $P_y$ is reduced by $N_w$ to reflect prior placement of yellow-only pixels, if any. If the result is less than or equal to zero, no further yellow pixels will be placed. If additional yellow pixels are required, the two nested loops in the last six lines of the code fragment will add these additional Y pixels to elements in the stochastic screen that already represent a basic color or a combination of basic colors. The location of these additions is defined by the spatial-priority matrix; therefore, yellow is added to the screen elements that are used to represent the most visible colors.

In a preferred embodiment using the spatial-priority matrix discussed below, pixels representing the most visible color are placed in the stochastic screen in an optimally uniform manner. If the stochastic screen is filled such that all elements are used to represent one or more colors but additional pixels remain to be added to the screen, the same spatial priority is used to add the additional pixels to the screen in an optimally uniform manner.

Preferred Spatial-Priority Matrix

The proper design of a spatial-priority matrix should take into account a number of factors. One factor is whether the intended display device can effectively display single isolated pixels. If the device cannot do so, the spatial-priority matrix should preferably be a "clustered-dot" or "amplitude-modulation" type matrix. If the device can effectively display an isolated pixel, the spatial-priority matrix should probably be a "dispersed-dot" or "frequency-modulation" matrix. Either type of matrix may be used to practice the present invention.

As mentioned above, the spatial-priority matrix can be implemented by a dither matrix and a number of techniques are known in the art for forming a dither matrix. For example, U.S. Pat. No. 5,557,709 describes an approach that chooses a homogenous distribution of dots that correspond to an arbitrarily chosen initial gray level. Individual dots are removed from the initial distribution to achieve progressively lower densities. The removal process identifies clusters of dots and removes dots from the tightest clusters so that the remaining dots are distributed homogeneously.

In instances where two or more dots are located in clusters that are equally tight, the homogeneity of the dots remaining after a dot is removed can be improved by using a second criterion to choose which dot to remove. The second criterion reassess the relative tightness of those clusters using only those dots that correspond to locations that will be removed at or near the current gray level. In effect, the removal process looks ahead to where dots will be removed for subsequently lighter levels and breaks the tie accordingly.

A spatial-priority matrix that is formed according to this improved process is preferred.

Aspect Ratio of Displayed Image

Various aspects of the present invention discussed above and most discussions in the prior art assume the display device has a 1:1 aspect ratio. As used herein, the term "aspect ratio" refers to the ratio of display vertical resolution to horizontal resolution. In other words, it is generally assumed that if a display device uses a square array of pixels to present an image, the resulting image will also be square.

This assumption is not true for many display devices. For example, an ink-jet printer that prints with a vertical resolution of 720 dots per inch (about 283 dots per cm) and a horizontal resolution of 360 dots per inch (about 142 dots per cm) has a 2:1 aspect ratio. An image formed from an array of 720-by-720 dots is one inch (2.5 cm) high and two inches (5 cm) wide. Stated differently, a display device that has an aspect ratio greater than 1:1 produces an image that is compressed vertically. An aspect ratio less than 1:1 results in an image that is compressed horizontally.

If either a conventional stochastic screening technique or a technique according to the present invention as described above is used with a device that has an aspect ratio that differs significantly from 1:1, the resulting compression of the image in one dimension causes worm-like artifacts to appear in areas of the image that are supposed to be uniform in color. In a device having an aspect ratio significantly greater than 1:1, for example, the resulting vertical compression generates worm-like artifacts that are oriented horizontally.

Figure 3:
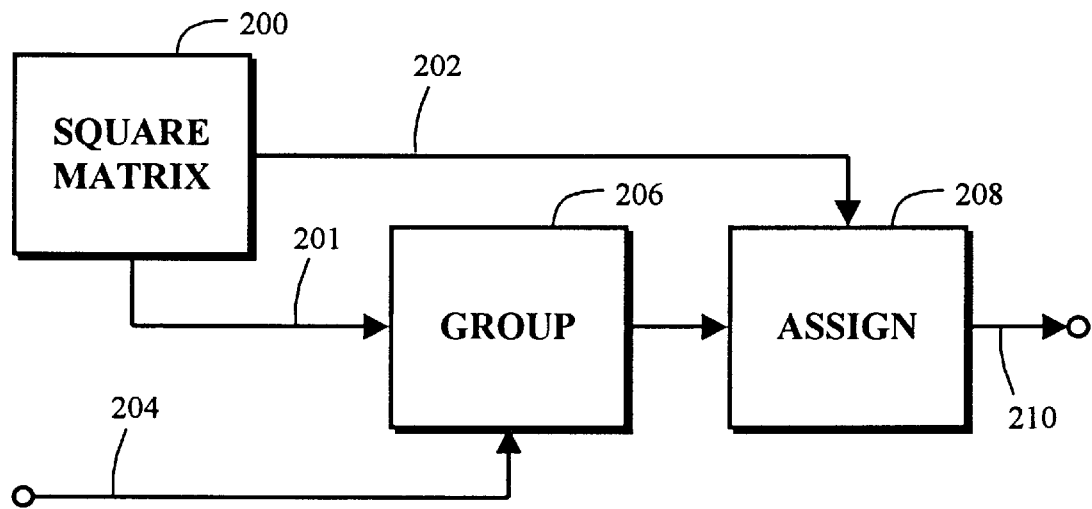
FIG. 3 is a functional block diagram illustrating the derivation of a spatial-priority matrix according to one aspect of the present invention that can be used for stochastic screening with a device having essentially any aspect ratio.

FIG. 3 illustrates a technique for deriving a spatial-priority matrix that is suitable for use with stochastic screening for a device that has essentially any aspect ratio. Square matrix 200 represents an N-by-N spatial-priority matrix suitable for use with a device having a 1:1 aspect ratio. Preferably, square matrix 200 represents the preferred spatial-priority matrix described above. Square matrix 200 provides along path 201 a signal representing the size of the spatial-priority matrix and provides along path 202 a desired order of fill in a square stochastic screen.

Group 206 receives from path 204 an aspect-ratio signal representing the aspect ratio of a display device. In response to the aspect-ratio signal and the matrix size received from path 201, group 206 forms groups of elements in the new spatial-priority matrix. The number of elements in each group and the dimensions of each group is determined from the two signals. For example, if the signal received from path 201 indicates that the square matrix contains N-by-N elements and the aspect-ratio signal received from path 204 indicates that the device has an x:y aspect ratio, group 206 forms the new matrix with yN-by-xN elements arranged in groups of y-by-x elements. Each group in the new matrix corresponds to a respective element in square matrix 200.

In response to the spatial priority information received from path 202, assign 208 determines the value of each element in the new matrix. Neither the way in which values are determined nor the values themselves are critical to the present invention. The general idea is that elements in the new matrix are assigned values such that the relative spatial priority of each respective element in groups in the new matrix correspond to the relative spatial priority of a respective element in square matrix 200. The derivation of the new spatial-priority matrix is completed when all elements in the new matrix have been assigned an appropriate value. An output signal generated along path 210 represents spatial-priority information in the new matrix that can be used with a device having the specified aspect ratio.

Figure 4:
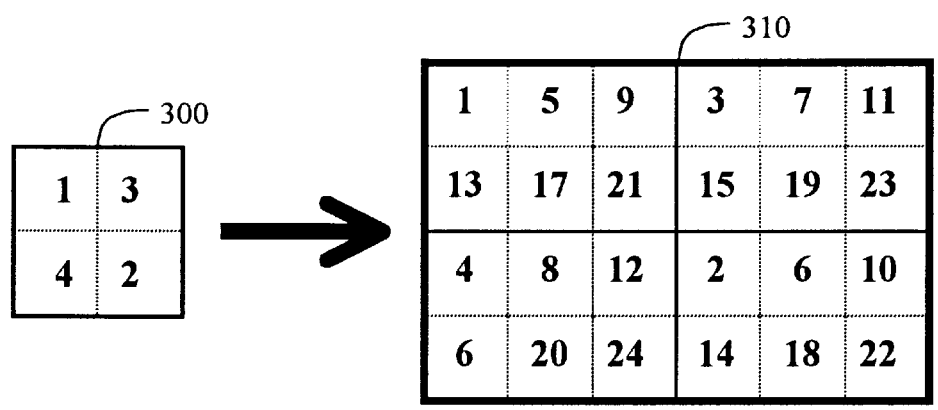
FIG. 4 illustrates the derivation of one embodiment of a spatial-priority matrix from a matrix representing the order of fill in a square stochastic screen.

FIG. 4 illustrates the derivation of one embodiment of a new spatial-priority matrix 310 from a square matrix 300 representing spatial-priority information for a square stochastic screen. In the example shown, the derived matrix is for use with a display device having a 2:3 aspect ratio.

Square matrix 300 represents a desired order of fill for a 2-by-2 stochastic screen. As discussed above, the particular values in the matrix are not critical to the present invention. New matrix 310 is formed to contain 6-by-4 elements arranged in groups of 3-by-2 elements. Each group of elements in new matrix 310 corresponds to a respective element in square matrix 300.

Values are assigned to a respective element in each group according to the values of the element in square matrix 300. The assignment of values could start with the upper-left element in each group, for example, assigning an appropriate value to that element in all groups, then continuing with the element to the immediate right of the first-assigned element, proceeding through the groups until all elements are assigned a value.

FIG. 4 illustrates the assignment of values to elements in the order described in the preceding paragraph. As may be seen from inspection of the element values in square matrix 300, the spatial priority proceeds from the upper-left element to the lower-right element, then to the upper-right element and finally to the lower-left element. The order of the groups in new matrix 310 in which elements are assigned values is the same. Starting with the upper-left group, an element is assigned the value 1. Proceeding to the lower-right group, an element in that group is assigned the value 2. Continuing with the upper-right group, an element in that group is assigned the value 3. Finally, in the lower-left group, an element is assigned the value 4. This completes one tier of assignments. The next tier of assignments begins by assigning the value 5 to another element in the upper-left group. This tier of assignments is completed when the value 8 is assigned to an element in the lower-left group. Subsequent tiers of assignments continue until all elements in each group have been assigned a value. For any particular tier, the order of spatial priority among the groups in new matrix 310 correspond to the spatial priority among the elements in square matrix 300.

According to this example, this particular assignment of values may be stated more generally as $$F = V + g \cdot N^2 \text{ for } 0 \leq g < G$$

where F=value to be assigned to an element in a group in new matrix 310,

V=value of the corresponding element in square matrix 300,

G=number of elements in each group of new matrix 310, and $N^2$=number of elements in square matrix 300.

After all elements are assigned a value, it may be desirable to rescale the values into a range corresponding to the range of values in the original square matrix 300. For example, if square matrix 300 is intended to define spatial priorities for a 256-element stochastic screen, the values in new matrix 310 can be mapped into the range from 1 to 256, or 0 to 255, for example. In many embodiments, the range corresponds to an n-bit grayscale. In this example, a 256-element screen corresponds to an 8-bit grayscale.

In an alternative embodiment, the element values range from 1 to $G \cdot N^2$, for example, and G pixels are added to the screen for every unit increase in pixel count.

Practical Considerations

The foregoing description has omitted a discussion of various practical considerations that may be important to overall device performance but which can be considered independently from the present invention. Examples of such considerations include gamma correction for computer monitor displays, color correction for printers, and quantization of density or grayscale levels to reduce storage requirements of correction tables. Such practical considerations may generally be taken into account according to known teachings in the art with respect to the use and formation of conventional stochastic screens.

We claim:

1. A method for generating output signals for use in a device for displaying a color image, said method comprising:

receiving a signal representing density of two or more basic colors in an area of said image, calculating in response to said signal a respective pixel count for each selected color of a plurality of selected colors, said plurality of selected colors comprising two or more of said basic colors and one or more combinations of said basic colors, forming a stochastic screen of display elements in a spatial order according to a spatial-priority matrix, wherein said display elements are formed to represent said selected colors in order according to a priority ranking of said selected colors and in numbers according to said respective pixel counts for selected colors, and generating said output signals in response to said stochastic screen.

2. A method according to claim 1 wherein said selected colors comprise cyan, magenta and cyan-plus-magenta, and wherein said priority ranking of selected colors is such that cyan-plus-magenta has a higher priority than cyan and magenta.

3. A method according to claim 2 wherein said selected colors further comprise black and cyan-plus-magenta-plus-yellow, and wherein said priority ranking of selected colors is such that black has a higher priority than cyan-plus-magenta-plus-yellow and cyan-plus-magenta-plus-yellow has a higher priority than cyan-plus-magenta.

4. A method according to claim 1 or 2 further comprising:

calculating in response to said signal a respective pixel count for each color in a set of non-selected colors, wherein said set of non-selected colors comprises one or more basic colors that are not selected colors, and forming said stochastic screen of display elements to also represent said non-selected colors in a spatial order according to said spatial-priority matrix, wherein said display elements are formed to represent said non-selected colors in order according to a priority ranking of said non-selected colors and in numbers according to said respective pixel counts for non-selected colors, wherein display elements that do not represent a selected color are used to represent a non-selected color before other display elements are used.

5. A method according to claim 1 wherein said spatial-priority matrix is of size I by J and represents an order for adding Y pixels to an area already containing Z pixels, where Z≧0, so that the resulting distribution of all X=Y+Z pixels in the area is optimally uniform provided X≦I·J but wherein the distribution of just said Y pixels need not be optimally uniform if Z>0.

6. An apparatus for generating output signals for use in displaying a color image, said apparatus comprising:

means for receiving a signal representing density of two or more basic colors in an area of said image, means for calculating in response to said signal a respective pixel count for each selected color of a plurality of selected colors, said plurality of selected colors comprising two or more of said basic colors and one or more combinations of said basic colors, means for forming a stochastic screen of display elements in a spatial order according to a spatial-priority matrix, wherein said display elements are formed to represent said selected colors in order according to a priority ranking of said selected colors and in numbers according to said respective pixel counts for selected colors, and means for generating said output signals in response to said stochastic screen.

7. An apparatus according to claim 6 wherein said selected colors comprise cyan, magenta and cyan-plus-magenta, and wherein said priority ranking of selected colors is such that cyan-plus-magenta has a higher priority than cyan and magenta.

8. An apparatus according to claim 7 wherein said selected colors further comprise black and cyan-plus-magenta-plus-yellow, and wherein said priority ranking of selected colors is such that black has a higher priority than cyan-plus-magenta-plus-yellow and cyan-plus-magenta-plus-yellow has a higher priority than cyan-plus-magenta.

9. An apparatus according to claim 6 or 7 further comprising:

means for calculating in response to said signal a respective pixel count for each color in a set of non-selected colors, wherein said set of non-selected colors comprises one or more basic colors that are not selected colors, and means for forming said stochastic screen of display elements to also represent said non-selected colors in a spatial order according to said spatial-priority matrix, wherein said display elements are formed to represent said non-selected colors in order according to a priority ranking of said non-selected colors and in numbers according to said respective pixel counts for non-selected colors, wherein display elements that do not represent a selected color are used to represent a non-selected color before other display elements are used.

10. An apparatus according to claim 6 wherein said spatial-priority matrix is of size I by J and represents an order for adding Y pixels to an area already containing Z pixels, where Z≧0, so that the resulting distribution of all X=Y+Z pixels in the area is optimally uniform provided X≦I·J, but wherein the distribution of just said Y pixels need not be optimally uniform if Z>0.

11. A medium readable by a machine embodying a program of instructions executable by said machine to perform a method for generating output signals for use in displaying a color image, said method comprising:

receiving a signal representing density of two or more basic colors in an area of said image, calculating in response to said signal a respective pixel count for each selected color of a plurality of selected colors, said plurality of selected colors comprising two or more of said basic colors and one or more combinations of said basic colors, forming a stochastic screen of display elements in a spatial order according to a spatial-priority matrix, wherein said display elements are formed to represent said selected colors in order according to a priority ranking of said selected colors and in numbers according to said respective pixel counts for selected colors, and generating said output signals in response to said stochastic screen.

12. A medium according to claim 11 wherein said selected colors comprise cyan, magenta and cyan-plus-magenta, and wherein said priority ranking of selected colors is such that cyan-plus-magenta has a higher priority than cyan and magenta.

13. A medium according to claim 12 wherein said selected colors further comprise black and cyan-plus-magenta-plus-yellow, and wherein said priority ranking of selected colors is such that black has a higher priority than cyan-plus-magenta-plus-yellow and cyan-plus-magenta-plus-yellow has a higher priority than cyan-plus-magenta.

14. A medium according to claim 11 or 12 wherein said method further comprises:

calculating in response to said signal a respective pixel count for each color in a set of non-selected colors, wherein said set of non-selected colors comprises one or more basic colors that are not selected colors, and forming said stochastic screen of display elements to also represent said non-selected colors in a spatial order according to said spatial-priority matrix, wherein said display elements are formed to represent said non-selected colors in order according to a priority ranking of said non-selected colors and in numbers according to said respective pixel counts for non-selected colors, wherein display elements that do not represent a selected color are used to represent a non-selected color before other display elements are used.

15. A method according to claim 11 wherein said spatial-priority matrix is of size I by J and represents an order for adding Y pixels to an area already containing Z pixels, where $Z \geq 0$, so that the resulting distribution of all $X=Y+Z$ pixels in the area is optimally uniform provided $X \leq I \cdot J$, but wherein the distribution of just said Y pixels need not be optimally uniform if $Z>0$.

16. A display device for displaying a color image, said display device comprising:

processing circuitry adapted to receive a signal representing density of two or more basic colors in an area of said image, calculate in response to said signal a respective pixel count for each selected color of a plurality of selected colors, said plurality of selected colors comprising two or more of said basic colors and one or more combinations of said basic colors, form a stochastic screen of display elements in a spatial order according to a spatial-priority matrix, wherein said display elements are formed to represent said selected colors in order according to a priority ranking of said selected colors and in numbers according to said respective pixel counts for selected colors, and generate an output signal in response to said stochastic screen, and a display component that displays said color image in response to said output signal.

17. A display device according to claim 16 wherein said display component is a mechanism for printing said color image onto a medium.

18. A display device according to claim 16 wherein said display component is a computer monitor display screen.

19. A computer system comprising a processor, random access memory coupled to said processor and a display device coupled to said processor, wherein said processor executes program instructions stored in said random access memory that cause said computer system to:

generate a signal representing density of two or more basic colors in an area of said image, calculate in response to said signal a respective pixel count for each selected color of a plurality of selected colors, said plurality of selected colors comprising two or more of said basic colors and one or more combinations of said basic colors, form a stochastic screen of display elements in a spatial order according to a spatial-priority matrix, wherein said display elements are formed to represent said selected colors in order according to a priority ranking of said selected colors and in numbers according to said respective pixel counts for selected colors, generate an output signal in response to said stochastic screen, and display via said display device a color image in response to said output signal.

20. A computer system according to claim 19 wherein said display device is a printer.

21. A computer system according to claim 19 wherein said display component is a computer monitor.

* * * * *

UNITED STATES PATENT AND TRADEMARK OFFICE
CERTIFICATE OF CORRECTION

PATENT NO. : 6,031,626
DATED : February 29, 2000
INVENTOR(S) : Joseph Shu, et al.

It is certified that errors appear in the above identified patent and that said Letters Patent is hereby corrected as shown below:

Column 11, line 26, insert --,-- after "X≤I·J".

Column 12, line 17, change "ofjust" to --of just--.

Signed and Sealed this

Sixth Day of February, 2001

*Attest:*

Q. TODD DICKINSON

*Attesting Officer*      *Director of Patents and Trademarks*